(12) United States Patent
Takagi et al.

(10) Patent No.: US 11,804,700 B2
(45) Date of Patent: Oct. 31, 2023

(54) SHEATH STRUCTURE AND WIRE HARNESS

(71) Applicant: Yazaki Corporation, Tokyo (JP)

(72) Inventors: Ayumu Takagi, Aichi (JP); Takashi Nomoto, Aichi (JP); Katsuya Yoshimura, Aichi (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/696,096

(22) Filed: Mar. 16, 2022

(65) Prior Publication Data

US 2022/0320841 A1    Oct. 6, 2022

(30) Foreign Application Priority Data

Mar. 30, 2021 (JP) ................................. 2021-056838

(51) Int. Cl.
*H02G 3/04* (2006.01)
*B60R 16/02* (2006.01)

(52) U.S. Cl.
CPC ....... *H02G 3/0468* (2013.01); *B60R 16/0215* (2013.01)

(58) Field of Classification Search
CPC ............ B60R 16/0207; B60R 16/0215; B60R 16/0222; H02G 3/0406; H02G 3/0468
See application file for complete search history.

(56) References Cited

U.S. PATENT DOCUMENTS

| 6,209,929 | B1* | 4/2001 | Ikegami | H02G 3/0691 285/139.2 |
|---|---|---|---|---|
| 10,559,895 | B2* | 2/2020 | Haas | H01R 13/6592 |
| 2017/0030498 | A1* | 2/2017 | Chu | B29C 49/0021 |
| 2017/0148542 | A1* | 5/2017 | Maeda | H02G 3/0468 |
| 2018/0158567 | A1* | 6/2018 | Yanazawa | B60R 16/0215 |
| 2019/0123531 | A1* | 4/2019 | Yoshimura | H02G 3/0691 |

FOREIGN PATENT DOCUMENTS

JP    2019-075946 A    5/2019

\* cited by examiner

*Primary Examiner* — Paresh Paghadal
(74) *Attorney, Agent, or Firm* — Sughrue Mion, PLLC

(57) ABSTRACT

A sheath structure includes an outer member, and an inner member formed in a cylindrical shape in a state in which a first portion and a second portion are engaged with an engaging portion, and capable of being fitted into the outer member from an end portion of the outer member. In the inner member, the first portion and the second portion are not engaged with the engaging portion but interfere with the end portion of the outer member and are not capable of being fitted into the outer member, when a maximum insertable number of the predetermined routed members insertable into the outer member are inserted therein. The first portion and the second portion are engaged with the engaging portion and capable of being fitted into the outer member, when the predetermined routed members of a prescribed number smaller than the maximum insertable number are inserted therein.

2 Claims, 4 Drawing Sheets

SHEATH STRUCTURE AND WIRE HARNESS

CROSS-REFERENCE TO RELATED APPLICATION(S)

The present application claims priority to and incorporates by reference the entire contents of Japanese Patent Application No. 2021-056838 filed in Japan on Mar. 30, 2021.

BACKGROUND OF THE INVENTION

1. Field of the Invention

The present invention relates to a sheath structure and a wire harness.

2. Description of the Related Art

For example, Japanese Patent Application Laid-open No. 2019-75946 discloses a protective member including a tubular section and an outer peripheral rib. The tubular section is fitted with an end portion of a corrugate tube, and harder than the corrugate tube. The outer peripheral rib is formed on the outer periphery of the tubular section to extend in a circumferential direction, and fitted into inner peripheral annular concave section in the end portion of the corrugate tube.

The protective member described above may be used or unused in accordance with, for example, the number of routed members inserted into the corrugate tube. It is desired to prevent improper use of the protective member and properly use the protective member.

SUMMARY OF THE INVENTION

The present invention has been made in view of the afore-mentioned circumstances, and an object of the present invention is to provide a sheath structure and a wire harness capable of using in a proper mode according to circumstances.

In order to achieve the above mentioned object, a sheath structure according to one aspect of the present invention includes an outer member formed in a cylindrical shape and into which routed members are insertable; and an inner member formed in a cylindrical shape in a state in which a first portion and a second portion are engaged with an engaging portion, capable of receiving the routed members inserted therein, and capable of being fitted into the outer member from an end portion of the outer member, wherein in the inner member, the first portion and the second portion are not engaged with the engaging portion but interfere with the end portion of the outer member and are not capable of being fitted into the outer member, when a maximum insertable number of the predetermined routed members insertable into the outer member are inserted therein, and the first portion and the second portion are engaged with the engaging portion and capable of being fitted into the outer member from the end portion of the outer member, when the predetermined routed members of a prescribed number smaller than the maximum insertable number are inserted therein.

In order to achieve the above mentioned object, a wire harness according to another aspect of the present invention includes routed members; and a sheath structure provided on the routed members from outside, the sheath structure including: an outer member formed in a cylindrical shape and into which the routed members are insertable; and an inner member formed in a cylindrical shape in a state in which a first portion and a second portion are engaged with an engaging portion, capable of receiving the routed members inserted therein, and capable of being fitted into the outer member from an end portion of the outer member, wherein in the inner member, the first portion and the second portion are not engaged with the engaging portion but interfere with the end portion of the outer member and are not capable of being fitted into the outer member, when a maximum insertable number of the predetermined routed members insertable into the outer member are inserted therein, and the first portion and the second portion are engaged with the engaging portion and capable of being fitted into the outer member from the end portion of the outer member, when the predetermined routed members of a prescribed number smaller than the maximum insertable number are inserted therein.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of the present invention will now be described hereinafter with reference to drawings. The present invention is not limited to the embodiment. Constituent elements in the following embodiment include elements that is obvious and can be replaced by a person skilled in the art, or substantially equivalent ones.

Embodiment

Figure 1:
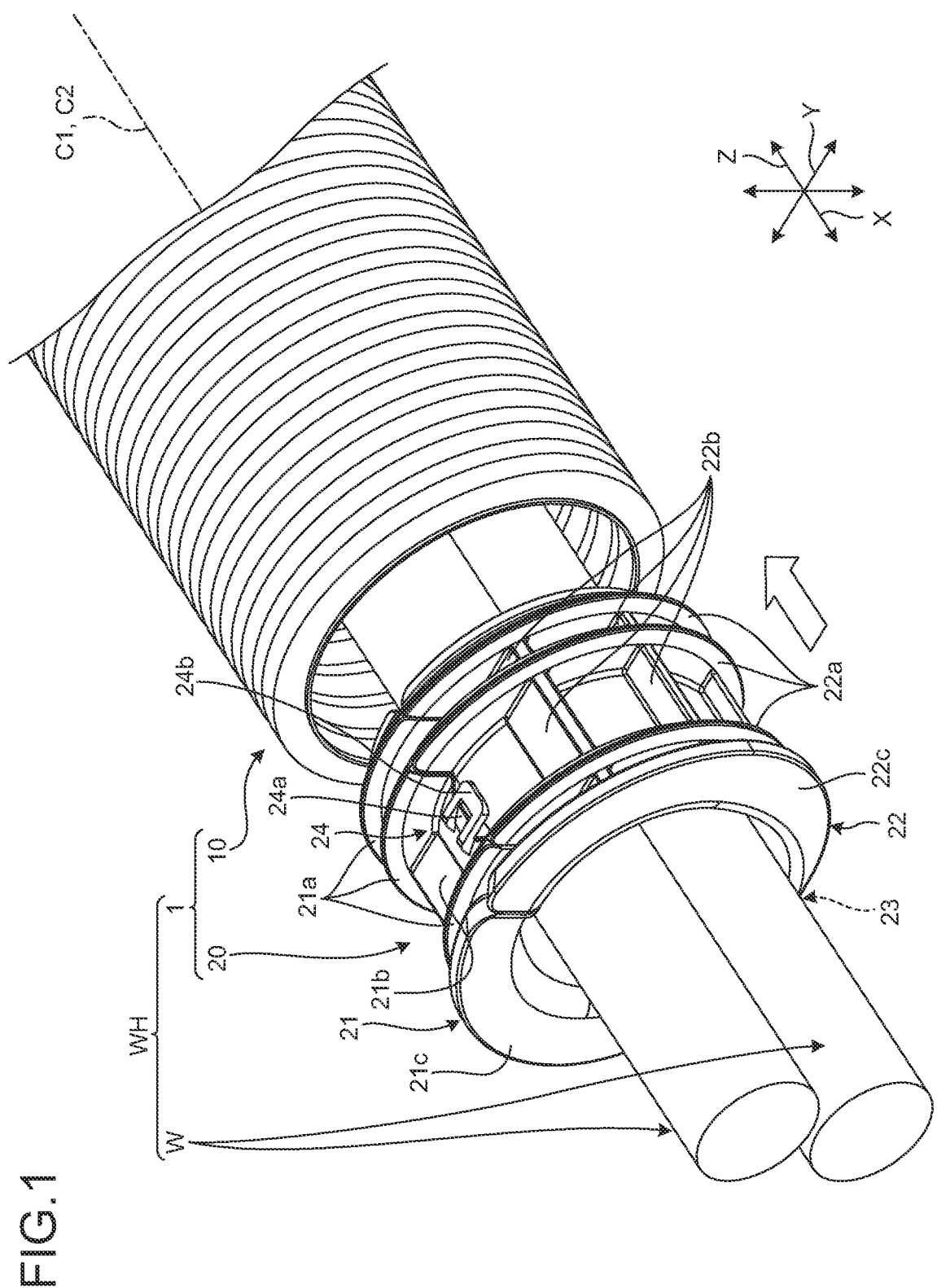
FIG. 1 is a partial perspective view illustrating a schematic structure of a wire harness according to an embodiment.
Figure 2:
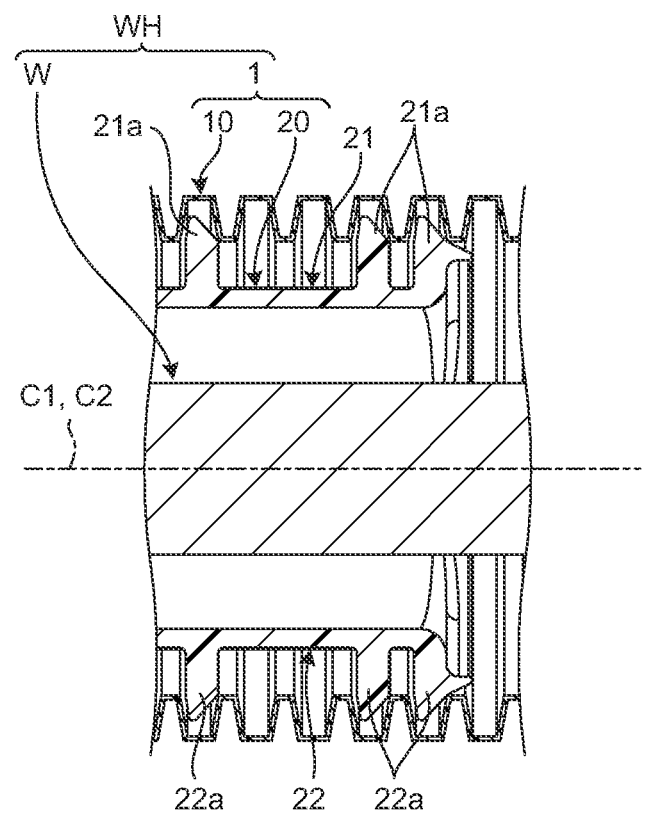
FIG. 2 is a partial sectional view illustrating a schematic structure of the wire harness according to the embodiment.

A sheath structure 1 illustrated in FIG. 1 and FIG. 2 is incorporated into a wire harness WH mounted on a vehicle or the like, and provided on routed members W having electrical conductivity from outside to protect the routed members W. In order to connect, for example, devices mounted on a vehicle, the wire harness WH is prepared by bundling a plurality of the routed members W used for power supply and/or signal communications into a module to connect the routed members W to each of the devices with connectors or the like. The wire harness WH includes the routed members W having electrical conductivity and a sheath structure 1. The routed members W are, for example, insulated wires each having a structure in which a core wire acquired by bundling a plurality of metal wires is covered with an insulating coating portion. As another example, the routed members W may be an insulated metal bar acquired by coating a metal bar with an insulating coating portion. The sheath structure 1 has a structure in which the routed members W are inserted through the inside, and provided on the routed members W from outside. The wire harness WH may be configured to further include various components, such as a grommet, an electrical connection box, a fixture, and a connector.

The sheath structure 1 according to the present embodiment includes an outer member 10 and an inner member 20. The inner member 20 is a member mounted inside the outer member 10 to prevent the outer member 10 from collapsing.

The inner member 20 may be used or unused due to, for example, a difference in number of routed members W inserted into the outer member 10 according to the required specifications. For example, when the number of routed members W inserted into the outer member 10 is large and a predetermined volume of the inside space of the outer member 10 is filled with many routed members W, the outer member 10 tends to be relatively hard to collapse by support from inside with the routed members W. In such a case, for example, there are cases where the inner member 20 does not require mounting to the outer member 10 in respect of required specifications.

The inner member 20 according to the present embodiment achieves a structure enabling use in a proper mode according to circumstances by adopting a structure preventing mounting to the outer member 10 erroneously in such a case. The following is a detailed explanation of each of structures of the sheath structure 1 with reference to drawings.

In the following explanation, three mutually crossing directions are referred to as "axis direction X", "width direction Y", and "height direction Z", respectively. The axis direction X, the width direction Y, and the height direction Z are mutually orthogonal. The axis direction X typically corresponds to the insertion direction, the routing direction, and the extending direction of the routed members W and the axis direction of the sheath structure 1 and the like, in a state in which the sheath structure 1 is disposed in a straight-line manner without being bent. The width direction Y and the height direction Z correspond to crossing directions (orthogonal directions) crossing (orthogonal to) the axis direction X. Each of the directions used in the following explanation is explained as a direction in a state in which the units are mutually assembled, unless particularly mentioned.

Specifically, the outer member 10 is a sheath member formed in a cylindrical shape and into which the routed members W can be inserted, as illustrated in FIG. 1 and FIG. 2. The outer member 10 is also referred to as corrugate or the like. The outer member 10 is formed of an insulating resin material or the like and in a substantially cylindrical shape having flexibility. The outer member 10 has a central axis C1 extending along the axis direction X. The outer member 10 has a bellows-like shape in which convex and concave shapes are repeatedly and successively formed along the axis direction X. The outer member 10 is provided with a slit (notch) along the axis direction X such that the outer member 10 is expandable to a certain degree when the routed members W are inserted therein. The outer member 10 protects the routed members W inserted therein along the axis direction X. A plurality of the routed members W can be inserted into the outer member 10.

Figure 5:
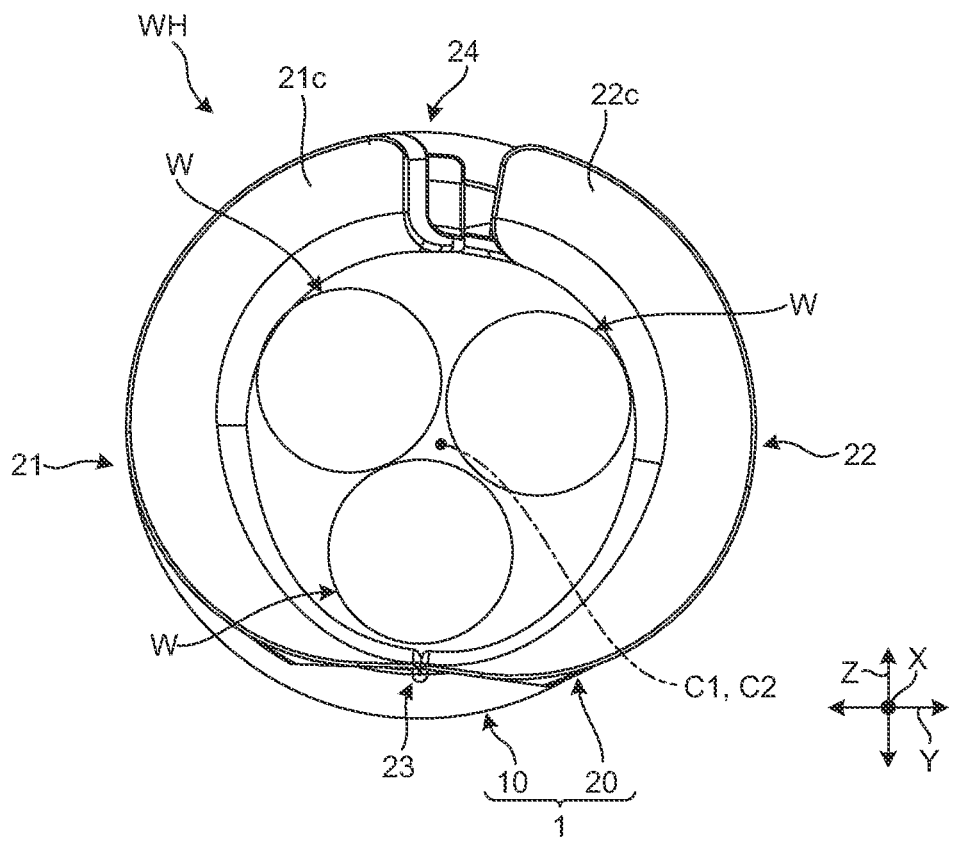
FIG. 5 is a front view illustrating a function of the inner member of the wire harness according to the embodiment.
Figure 6:
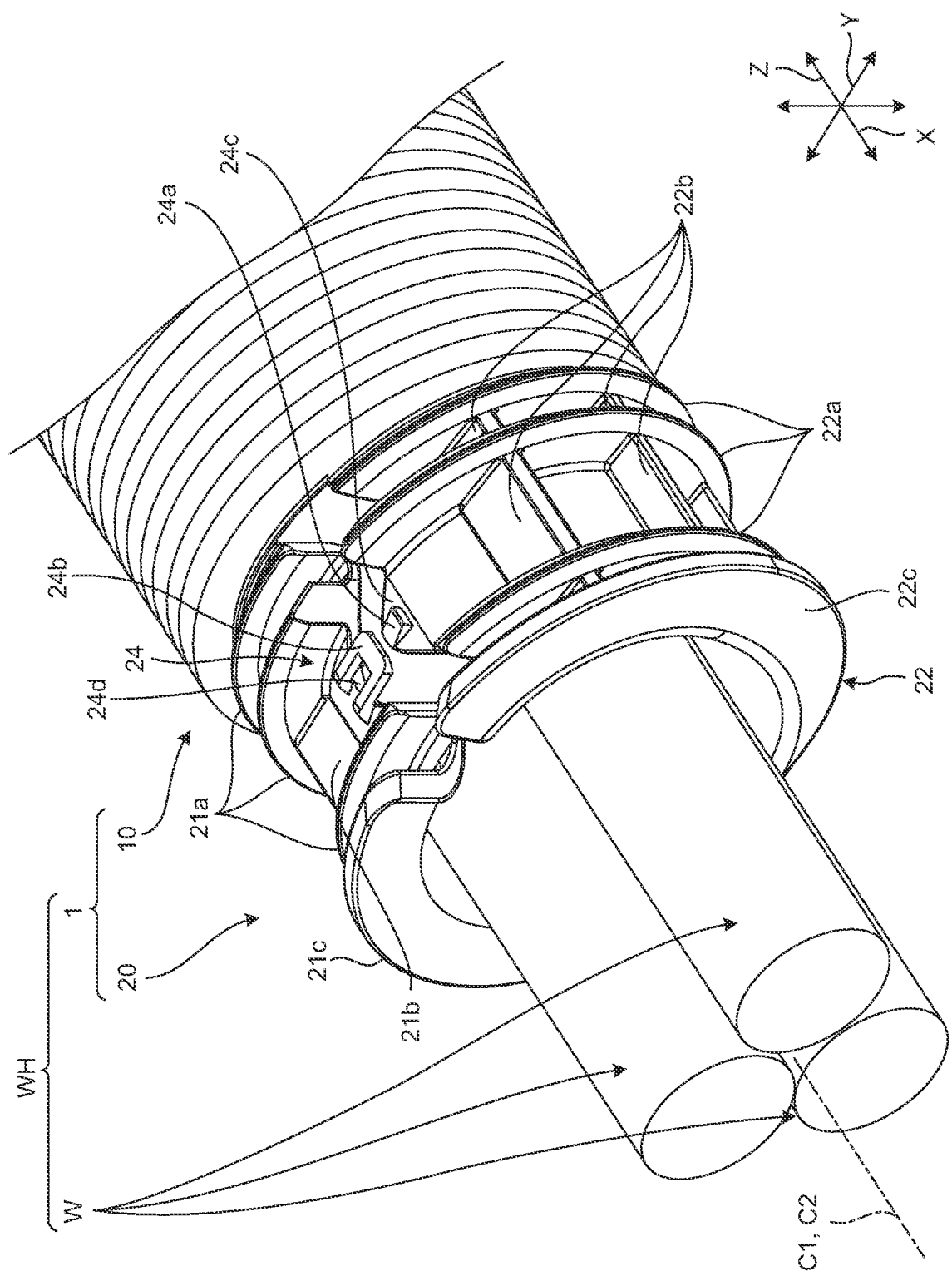
FIG. 6 is a partial perspective view illustrating a function of the inner member of the wire harness according to the embodiment.

The outer member 10 according to the present embodiment is, as an example, formed to receive three routed members W as the maximum insertable number of routed members W (see FIG. 5 and FIG. 6 and the like). The maximum insertable number of routed members W in the outer member 10 is the maximum number of routed members W insertable into the outer member 10, when the predetermined routed members W are inserted into the outer member 10. In this example, the predetermined routed members W are routed members W in which an outer diameter, a material, or the like is predetermined in accordance with the required specifications or the like. In this example, the predetermined routed members W are typically illustrated as ones having mutually substantially equal outer diameters.

Figure 3:
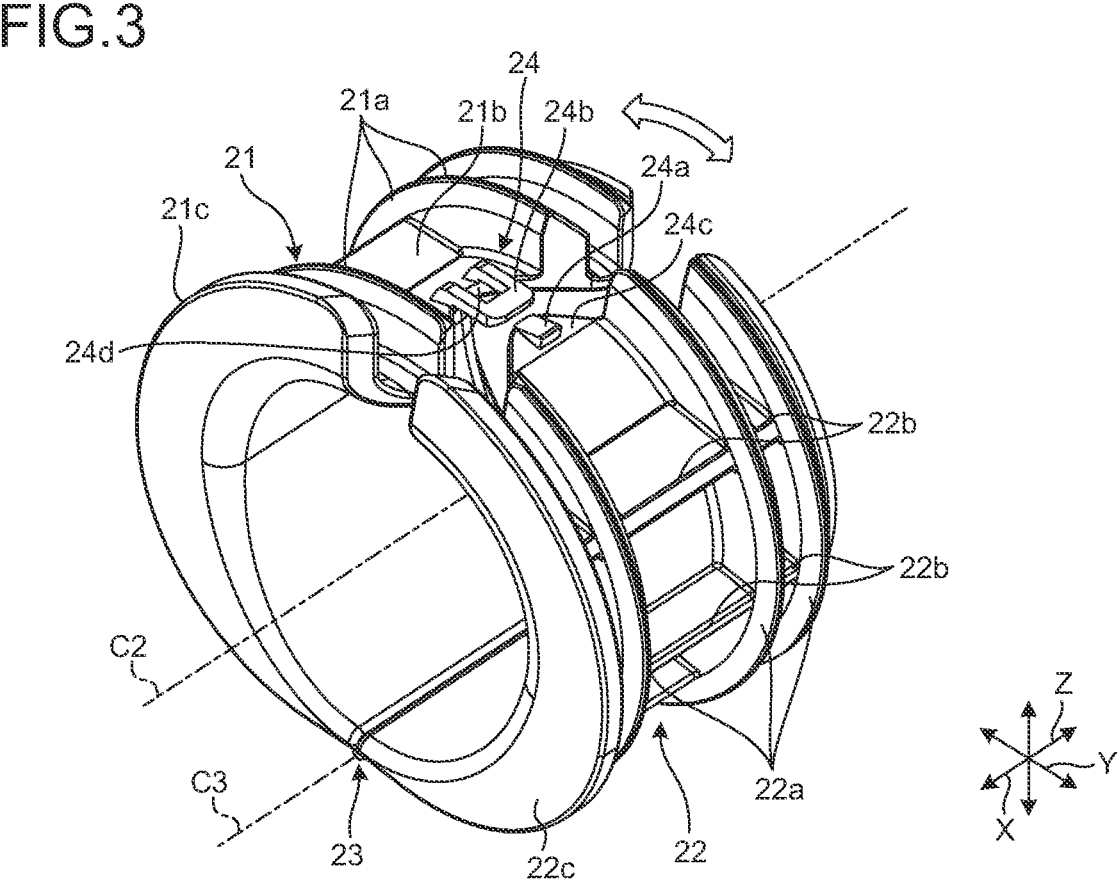
FIG. 3 is a perspective view illustrating a schematic structure of an inner member of the wire harness according to the embodiment.

The inner member 20 is a structural member (frame member) formed in a cylindrical shape, capable of receiving routed members W inserted therein, and capable of being fitted into the outer member 10 from an end portion of the outer member 10, as illustrated in FIG. 1, FIG. 2, and FIG. 3. The inner member 20 is also referred to as corrugate inner or the like. The inner member 20 is formed in a substantially cylindrical shape and formed of an insulating resin material or the like having rigidity higher than that of the outer member 10. The inner member 20 has a central axis C2 substantially coaxial with the central axis C1 of the outer member 10 and extending along the axis direction X, in a state in which the inner member 20 is mounted inside the outer member 10.

The inner member 20 according to the present embodiment includes a first portion 21, a second portion 22, a hinge portion 23, and an engaging portion 24, and the portions are formed as one unitary piece. The inner member 20 is formed in a substantially cylindrical shape in a state in which the first portion 21 and the second portion 22 are engaged with the engaging portion 24, and routed members W are insertable into the inner member 20.

Each of the first portion 21 and the second portion 22 is a portion formed in a substantially semicircular gutter shape. The first portion 21 and the second portion 22 form a substantially cylindrical shape in a state in which they are mutually interlocked with their curved and recessed sides mutually opposed in the width direction Y. The first portion 21 includes an outer surface provided with circumferential ribs 21a, axial ribs 21b, and the like. In the same manner, the second portion 22 includes an outer surface provided with circumferential ribs 22a, axial ribs 22b, and the like. The circumferential ribs 21a and 22a are formed on the respective outer surfaces of the first portion 21 and the second portion 22 along the circumferential direction (direction around the central axis C2). A plurality of the circumferential ribs 21a and a plurality of the circumferential ribs 22a are provided at intervals therebetween in the axis direction X. Each of the circumferential ribs 21a and 22a is provided with a taper serving as a guide surface when the inner member 20 is fitted into the outer member 10 from the end portion of the outer member 10. In the state in which the inner member 20 is fitted into the outer member 10, the circumferential ribs 21a and 22a are engaged with the bellows-like shape (convex/concave shape) of the inner surface of the outer member 10 to position the inner member 20 inside the outer member 10 in the axis direction X (see FIG. 2). The axial ribs 21b and 22b are formed on the respective outer surfaces of the first portion 21 and the second portion 22 along the axis direction X. The axial ribs 21b and 22b are formed between the circumferential ribs 21a and 22a, respectively, to connect them. The axial ribs 21b and the axial ribs 22b are provided at intervals therebetween in the circumferential direction. The first portion 21 and the second portion 22 are provided with flange portions 21c and 22c, respectively, on end portions (end portions on a side opposite to the side fitted into the outer member 10) of a side in the axis direction X.

The hinge portion 23 is a portion interposed between the first portion 21 and the second portion 22 and connecting the first portion 21 and the second portion 22 relatively rotatably. In other words, the first portion 21 and the second portion 22 are relatively rotatably connected via the hinge portion 23. The hinge portion 23 is formed as a thin portion (thin portion thinner than the thickness of the first portion 21, the second portion 22, and the like) extending in the axis direction X and interposed between end portions of the first portion 21 and the second portion 22 mutually opposed in the circumferential direction. With the structure, the hinge portion 23 forms a rotation axis extending along the axis direction X, and a rotation axis C3 is set along the axial direction X. The rotation axis C3 is an axis serving as a rotation center of the first portion 21 and the second portion 22. The first portion 21 and the second portion 22 are rotatable (openable and closable) between a closed position (see FIG. 1) and an opened position (see FIG. 3) via the hinge portion 23 around the rotation axis C3 serving as the rotation center. The closed position is a position in which the first portion 21 and the second portion 22 are mutually interlocked to form a substantially cylindrical shape. By contrast, the opened position is a position in which the first portion 21 and the second portion 22 are separated with a space therebetween at their end portions on a side opposite to the hinge portion 23 side.

The engaging portion 24 is a locking portion mutually engaging the first portion 21 and the second portion 22. The engaging portion 24 engages (locks) the first portion 21 and the second portion 22 in a state in which the first portion 21 and the second portion 22 are in the closed position, that is, in a state in which the first portion 21 and the second portion 22 are mutually interlocked to form a substantially cylindrical shape. The engaging portion 24 engages the end portions of the first portion 21 and the second portion 22 on the side opposite to the hinge portion 23 side. In this example, the engaging portion 24 includes an engaging hook portion 24a and an engaging arm portion 24b. The engaging hook portion 24a is formed as a hook-shaped projecting portion on an end portion of one of the first portion 21 and the second portion 22. In this example, the engaging hook portion 24a is formed on the end portion of the second portion 22. The engaging arm portion 24b is formed as a hook portion capable of locking the engaging hook portion 24a on an end portion of the other of the first portion 21 and the second portion 22. In this example, the engaging arm portion 24b is formed on the end portion of the first portion 21. The engaging portion 24 mutually engages the first portion 21 with the second portion 22 in a state in which they are in the closed position, by locking of the engaging hook portion 24a with the engaging arm portion 24b, and retains the state in which the first portion 21 and the second portion 22 are in the closed position.

In the second portion 22, an end portion in which the engaging hook portion 24a is formed projects in the circumferential direction to form a chevron-shaped projecting portion 24c. In the first portion 21, an end portion in which the engaging arm portion 24b is formed is recessed in the circumferential direction to form a V-shaped recessed portion 24d. The projecting portion 24c and the recessed portion 24d are formed in sizes and shapes with which the projecting portion 24c is fitted into the recessed portion 24d in the state in which the first portion 21 and the second portion 22 are in the closed position. In other words, it can also be said that the first portion 21 and the second portion 22 have wavy shapes with which their end portions including the projecting portion 24c and the recessed portion 24d are mutually engaged on the engaging portion 24 side. This structure enables the projecting portion 24c and the recessed portion 24d of the inner member 20 to function as a guiding shape when the first portion 21 and the second portion 22 are rotated from the opened position to the closed position and the engaging hook portion 24a is locked with the engaging arm portion 24b. In this operation, the inner member 20 is able to also function as a portion regulating biting of the routed members W by the projecting portion 24c and the recessed portion 24d. Consequently, the inner member 20 enables smooth engagement of the first portion 21 and the second portion 22 via the engaging portion 24. The wavy shaped portions including the projecting portion 24c and the recessed portion 24d in the first portion 21 and the second portion 22 in the inner member 20 also function as protective portions protecting the engaging hook portion 24a and the engaging arm portion 24b and preventing breakage. Consequently, the inner member 20 also enables improvement in durability.

The inner member 20 configured as described above has, as an erroneous mounting preventing structure, a structure with which the first portion 21 and the second portion 22 are not engaged with the engaging portion 24 but interfere with the end portion of the outer member 10 and cannot be fitted into the outer member 10, when a maximum insertable number of predetermined routed members W insertable into the outer member 10, that is, a maximum insertable number of routed members W are inserted therein, as illustrated in FIG. 5 and FIG. 6. Specifically, when a maximum insertable number of routed members W are inserted into the inner member 20, the first portion 21 and the second portion 22 are not engageable with the engaging portion 24, but the inner member 20 interferes with the end portion of the outer member 10 and cannot be fitted into the outer member 10 when the inner member 20 in this state is to be inserted into the inside of the outer member 10 from the end portion of the outer member 10.

Figure 4:
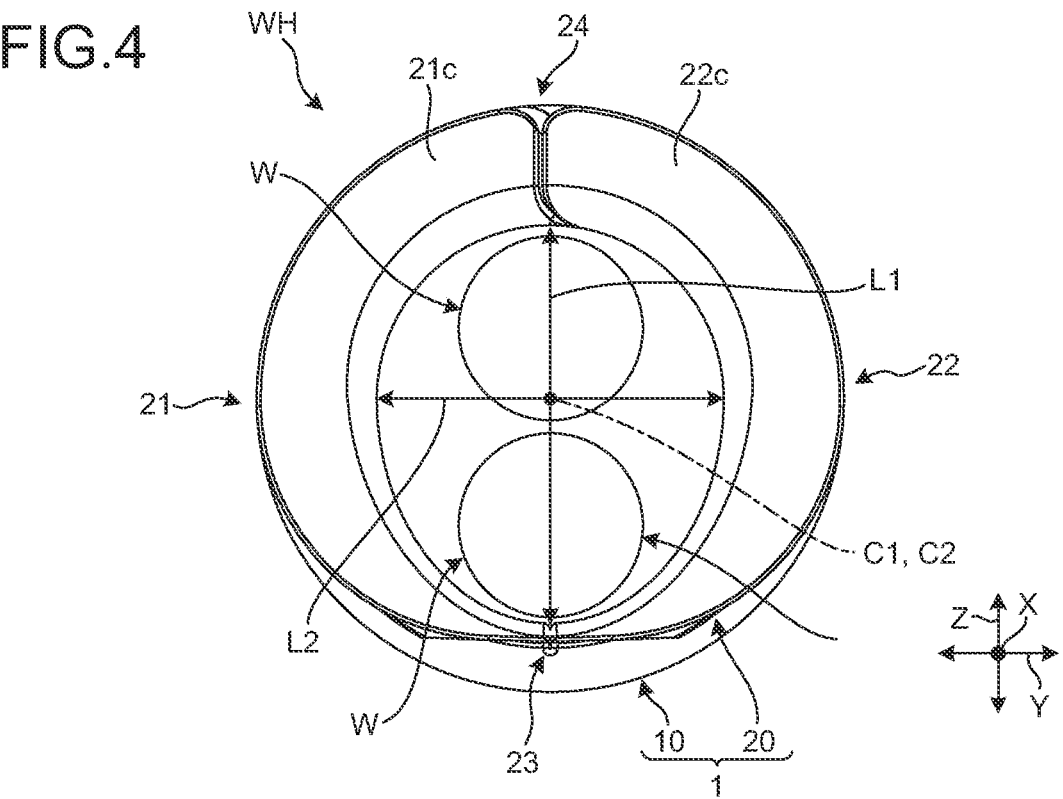
FIG. 4 is a front view illustrating a schematic structure of the inner member of the wire harness according to the embodiment.

By contrast, as illustrated in FIG. 1 and FIG. 4, when predetermined routed members W of a prescribed number smaller than the maximum insertable number, that is, a normal prescribed number, are inserted into the inner member 20, the first portion 21 and the second portion 22 are engaged with the engaging portion 24, and the inner member 20 can be fitted into the outer member 10 from the end portion of the outer member 10. In this example, the normal prescribed number is two or less which is smaller than three. Specifically, when a normal prescribed number of routed members W smaller than the maximum insertable number are inserted into the inner member 20, the first portion 21 and the second portion 22 are engageable with the engaging portion 24, and the inner member 20 does not interfere with the end portion of the outer member 10 but can be fitted into the outer member 10 when the inner member 20 in this state is to be inserted into the inside of the outer member 10 from the end portion of the outer member 10.

Specifically, as illustrated in FIG. 4, the inner member 20 is formed in a flat shape such that an interval of the inner surface thereof in the width direction Y (corresponding to the second direction) is narrower than a width L1 of the inner surface in the height direction Z (corresponding to the first direction), in the state in which the first portion 21 and the second portion 22 are engaged with the engaging portion 24. In this example, the inner member 20 is formed such that the inner surface thereof has a substantially oval shape in the state in which the first portion 21 and the second portion 22 are engaged with the engaging portion 24. The major axis of the oval extends along the height direction Z (first direction), and the minor axis of the oval extends along the width direction Y (second direction).

In addition, as illustrated in FIG. 5 and FIG. 6, when a maximum insertable number of routed members W are inserted into the inner member 20, the first portion 21 and the second portion 22 interfere with the routed members W arranged in a line in the width direction Y and are not engageable with the engaging portion 24. In this manner, the inner member 20 achieves the erroneous mounting preventing structure as described above.

By contrast, as illustrated in FIG. 1 and FIG. 4, when a normal prescribed number of routed members W are inserted into the inner member 20, the first portion 21 and the second portion 22 do not interfere with the routed members W but are engageable with the engaging portion 24. In this case, the routed members W are not arranged in the width direction Y in the inner member 20, and the inner member 20 does not interfere with the routed members W arranged in a line in the height direction Z.

The sheath structure 1 and the wire harness WH explained above can be used in a proper mode according to circumstances, even when the inner member 20 is used or unused due to a difference in number of routed members W inserted into the outer member 10 according to the required specifications or the like.

Specifically, the sheath structure 1 has a structure in which the first portion 21 and the second portion 22 in the inner member 20 are engaged with the engaging portion 24 when the number of routed members W to be inserted into the outer member 10 is the normal prescribed number or less, and the volume filled with the routed members W in the inner space of the sheath structure 1 is less than the predetermined volume. This structure enables the sheath structure 1 to cause the inner member 20 to be fitted into the outer member 10 from the end portion of the outer member 10 and mounted inside the outer member 10. Consequently, the sheath structure 1 is able to support the outer member 10 from inside with the inner member 20 and prevent the outer member 10 from collapsing.

By contrast, when the number of routed members W inserted into the outer member 10 is the maximum insertable number and the volume filled with the routed members W in the inner space of the sheath structure 1 is the predetermined volume or more, the outer member 10 of the sheath structure 1 is supported from inside with the routed members W and is relatively hard to collapse even without using the inner member 20. In such a case, in the sheath structure 1, the first portion 21 and the second portion 22 are not engaged with the engaging portion 24 in the inner member 20. In this manner, the outer shape of the inner member 20 is relatively larger than that in the state in which the first portion 21 and the second portion 22 are engaged with the engaging portion 24. With this structure, the sheath structure 1 is able to cause the inner member 20 to interfere with the outer member 10 and be prevented from being mounted inside the outer member 10 even when the inner member 20 is to be fitted into the outer member 10 from the end portion of the outer member 10. Consequently, the sheath structure 1 is able to prevent erroneous mounting of the inner member 20 when mounting of the inner member 20 to the outer member 10 is unnecessary.

As described above, the sheath structure 1 and the wire harness WH are able to prevent improper use of the inner member 20 in the case where the inner member 20 is unnecessary, and enable use of the inner member 20 in a proper mode according to circumstances.

The sheath structure 1 and the wire harness WH explained above have a structure in which the width L2 of the inner surface of the inner member 20 in the width direction Y is narrower than the width L1 of the inner surface of the inner member 20 in the height direction Z, in the state in which the first portion 21 and the second portion 22 are engaged with the engaging portion 24. In this manner, the inner member 20 achieves the structure in which the first portion 21 and the second portion 22 interfere with the routed members W arranged in a line in the width direction Y and are not engageable with the engaging portion 24 when a maximum insertable number of routed members W are inserted into the inner member 20, while the first portion 21 and the second portion 22 do not interfere with the routed members W and are engageable with the engaging portion 24 when a normal prescribed number of routed members W are inserted into the inner member 20. With this structure, the sheath structure 1 achieves the structure in which the inner member 20 is physically unattachable to the outer member 10 as described above when the number of routed members W to be inserted into the outer member 10 is the maximum insertable number, and achieves the erroneous mounting preventing structure for the inner member 20 as described above. Consequently, the sheath structure 1 and the wire harness WH enable use in a proper mode according to circumstances as described above.

The sheath structure and the wire harness according to the embodiment of the present invention described above are not limited to the embodiment described above, but various changes are possible within a range described in the claims.

The explanation provided above illustrates that the inner member 20 includes the first portion 21, the second portion 22, the hinge portion 23, and the engaging portion 24, and is formed of the portions provided as one unitary piece, but the structure is not limited thereto. The inner member 20 may have a structure in which, for example, no hinge portion 23 is provided and the first portion 21 and the second portion 22 are formed as separate pieces and engaged and united into a cylindrical shape with a plurality of the engaging portions 24.

The explanation provided above illustrates that the inner member 20 includes an inner surface having a substantially oval shape in a state in which the first portion 21 and the second portion 22 are engaged with the engaging portion 24, but the structure is not limited thereto. The inner member 20 may be typically formed in a substantially rectangular shape, a substantially rhombic shape, or a substantially triangular shape, as long as the inner member 20 has a shape in which the width L2 of the inner surface in the width direction Y is narrower than the width L1 of the inner surface in the height direction Z.

As another example, the inner member 20 may have a shape in which the width L1 of the inner surface in the height direction Z is narrower than the width L2 of the inner surface in the width direction Y. In this case, in the inner member 20, the width direction Y corresponds to the first direction and the height direction Z corresponds to the second direction. Specifically, in this case, the inner member 20 has the structure in which the first portion 21 and the second portion 22 interfere with the routed members W arranged in a line in the height direction Z and are not engageable with the engaging portion 24 when a maximum insertable number of routed members W are inserted into the inner member 20, while the first portion 21 and the second portion 22 do not interfere with the routed members W but are engageable with the engaging portion 24 when a normal prescribed number of routed members W are inserted into the inner member 20.

In addition, the explanation provided above illustrates that the routed members W are not arranged in the width direction Y in the inner member 20, and the inner member 20 does not interfere with the routed members W arranged in a line in the height direction Z, but the structure is not limited thereto. In this case, the inner member 20 may have a structure in which a relatively small number of routed members W are arranged in the Y direction in comparison with the case where a maximum insertable number of routed members W are inserted into the inner member 20 and the inner member 20 does not interfere with the routed members W.

The sheath structure and the wire harness according to the present embodiment may be configured by proper combinations of constituent elements of the embodiment and/or the modification explained above.

The sheath structure and the wire harness according to the present embodiment produce the effect of enabling use in a proper mode according to circumstances.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A sheath structure comprising:
   an outer member formed in a cylindrical shape; and
   an inner member formed in a cylindrical shape in a state in which a first portion and a second portion are engaged with an engaging portion, wherein
   a plurality of circumferential ribs are provided on an outer surfaces of the first portion and the second portion at intervals along the axial direction, and a plurality of axial ribs are provided on the outer surface of the first portion and the second portion at intervals therebetween in a circumferential direction,
   wherein a number of routed members are inserted into the inner member,
   wherein the inner member is configured to fit into the outer member only in the state in which the first portion and the second portion are engaged with the engaging portion, and
   wherein engagement of the first portion and the second portion with the engaging portion is dependent on the number of routed members not exceeding a maximum insertable number.

2. A wire harness comprising:
   routed members; and
   a sheath structure provided on the routed members from outside,
   the sheath structure including:
   an outer member formed in a cylindrical shape and into which the routed members are inserted; and
   an inner member formed in a cylindrical shape in a state in which a first portion and a second portion are engaged with an engaging portion, comprising the routed members inserted therein, and comprising fitted into the outer member from an end portion of the outer member, wherein
   a plurality of circumferential ribs are provided on an outer surfaces of the first portion and the second portion at intervals along the axial direction, and a plurality of axial ribs are provided on the outer surface of the first portion and the second portion at intervals therebetween in a circumferential direction,
   wherein the inner member is configured to fit into the outer member only in the state in which the first portion and the second portion are engaged with the engaging portion, and
   wherein engagement of the first portion and the second portion with the engaging portion is dependent on the number of routed members not exceeding a maximum insertable number.

* * * * *